US008327355B2

(12) United States Patent
Dow et al.

(10) Patent No.: US 8,327,355 B2
(45) Date of Patent: Dec. 4, 2012

(54) METHOD, COMPUTER PROGRAM PRODUCT, AND HARDWARE PRODUCT FOR SUPPORTING VIRTUAL MACHINE GUEST MIGRATION OVERCOMMIT

(75) Inventors: Eli M. Dow, Poughkeepsie, NY (US); Frank R. LeFevre, Jr., Poughkeepsie, NY (US); Ray Mansell, Salt Point, NY (US); Jessie Yu, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1149 days.

(21) Appl. No.: 12/173,425

(22) Filed: Jul. 15, 2008

(65) Prior Publication Data

US 2010/0017800 A1     Jan. 21, 2010

(51) Int. Cl.
G06F 9/455    (2006.01)
G06F 15/16   (2006.01)
G06F 21/00   (2006.01)

(52) U.S. Cl. .................... 718/1; 709/201; 711/6
(58) Field of Classification Search .......... None
See application file for complete search history.

(56) References Cited

U.S. PATENT DOCUMENTS

| 7,257,811 B2 | 8/2007 | Hunt et al. |
| 2004/0128670 A1* | 7/2004 | Robinson et al. ............ 718/1 |
| 2005/0086523 A1 | 4/2005 | Zimmer et al. |
| 2005/0160151 A1 | 7/2005 | Rawson |
| 2006/0005189 A1 | 1/2006 | Vega et al. |
| 2006/0294519 A1 | 12/2006 | Hattori et al. |
| 2007/0006218 A1 | 1/2007 | Vinberg et al. |
| 2007/0050764 A1 | 3/2007 | Traut |
| 2007/0061441 A1 | 3/2007 | Landis et al. |
| 2007/0061492 A1 | 3/2007 | van Riel |
| 2007/0079307 A1* | 4/2007 | Dhawan et al. ............ 718/1 |
| 2007/0130366 A1 | 6/2007 | O'Connell et al. |
| 2007/0244972 A1 | 10/2007 | Fan |
| 2007/0266383 A1 | 11/2007 | White |
| 2007/0271559 A1 | 11/2007 | Easton et al. |
| 2009/0063749 A1 | 3/2009 | Dow |
| 2010/0017800 A1 | 1/2010 | Dow et al. |

OTHER PUBLICATIONS

L. Van Doorn, "Hardware Virtualization", ETISS Lecture, Oct. 2007, pp. 1-55.
B. Von Axelson, "Using Virtualization" Microsoft, pp. 1-22.
"Cloud Computing: Benefits and Risks of Moving Federal IT into the Cloud", Testimony of Cita M. Furlani, Director, Information Technology Laboratory, National Institute of Standards and Technology, United States Department of Commerce, United States House of Representatives Committee on Oversight and Government Reform, Jul. 1, 2010.
IBM Redbooks; "IBM Information Infrastructure Solutions Handbook"; IP.Com; Jun. 2010.

* cited by examiner

Primary Examiner — Kenneth Tang
(74) Attorney, Agent, or Firm — Cantor Colburn LLP; Steven Chiu

(57) ABSTRACT

Virtual machine guest migration overcommit is supported by providing a virtual machine with an unschedulable resource that is not available for system scheduling. The unschedulable resource may, but need not, be provided in the form of a memory buffer, or one or more network resources, or one or more resources that are accessible from a network. The unschedulable resource is utilized in one or more domains to temporarily conceal one or more user environments that do not fit into a set of currently available resources, such that the one or more temporarily concealed user environments are not terminated or paged out.

17 Claims, 8 Drawing Sheets

METHOD, COMPUTER PROGRAM PRODUCT, AND HARDWARE PRODUCT FOR SUPPORTING VIRTUAL MACHINE GUEST MIGRATION OVERCOMMIT

BACKGROUND OF THE INVENTION

1. Field of the Invention

This invention relates to the field of computing and, in particular, to methods, computer program products, and hardware products for supporting virtual machine guest migration overcommit.

2. Description of Background

Mainframes and other computing machines supporting virtual guests typically provide some level of overcommit of resources to guests. More specifically, an overcommit of resources means that the sum total of all allocated guest resources exceeds the physical resources of a host machine.

Various techniques exist for supporting resource overcommit, such as swapping, ballooning, page sharing, and live migration. Swapping, a classical way to support overcommit, is implemented by the host machine selecting memory pages from one of the guests and writing them out to disk, thus freeing the memory pages for use. Should a guest require access to memory pages that have been swapped, the host reads data back from the disk. With ballooning, the guest and the host machine cooperate to determine which memory page or pages are to be evicted. It is the responsibility of the guest to select an appropriate memory page or pages and perform the actual swap if necessary. Page sharing is implemented by a hypervisor performing a search to locate two or more memory pages that include identical data. Any such pages are all merged into a single page, and this single page is then marked read only. If a guest writes to a shared page, it is unshared before granting the guest write access. Live migration involves the hypervisor moving one or more guests to a different host, thereby freeing the memory used by these guests.

Ballooning is fairly efficient since it relies on the guest to pick the memory to be evicted. Many times, the guest can simply shrink its cache in order to free memory. This approach often has a very low impact on the guest. However, one problem with ballooning is that it relies on guest cooperation which may reduce overall reliability. Swapping does not depend on the guest at all, so it is completely reliable from the host's point of view. However, the host has less knowledge than the guest about the guest's memory, so swapping is less efficient than ballooning. Page sharing relies indirectly on guest behavior. As long as guests are all running similar applications, the host will achieve a high share ratio. But if a guest starts running new applications, the share ratio will decrease and free memory in the host will drop. Live migration does not depend on the guest, but instead on the availability of free memory on other hosts in a virtualization pool. If other hosts do not have free space, one cannot migrate to them. In addition, live migration takes time, whereas the host may not have sufficient time when facing a memory shortage.

At present, many virtual machine hypervisors provide the necessary functionality to transmit guest instances from one machine to another. This functionality is sometimes termed migration, vmotion, or xenmotion. However, no technique presently exists for overcommitting virtual machines in a migration situation. Moreover, many virtual machines provide no mechanism for implementing an overcommit of resources.

SUMMARY

A method for supporting virtual machine guest migration overcommit provides a virtual machine with an unschedulable resource that is not available for system scheduling. The unschedulable resource may, but need not, be provided in the form of a memory buffer, or one or more network resources, or one or more resources that are accessible from a network. The unschedulable resource is utilized in one or more domains to temporarily conceal one or more user environments that do not fit into a set of currently available resources, such that the one or more temporarily concealed user environments are not terminated or paged out.

Computer program products and hardware products corresponding to the above-summarized methods are also described and claimed herein. Other methods, hardware products, and/or computer program products according to embodiments will be or become apparent to one with skill in the art upon review of the following drawings and detailed description. It is intended that all such additional methods, hardware products, and/or computer program products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

When a guest computer system is emulated on a host computer system, the guest computer system is said to be a "virtual machine" as the guest computer system exists in the host computer system as a pure software representation of the operation of one or more specific hardware architectures. The terms emulator, virtual machine, and processor emulation are sometimes used interchangeably to denote the ability to mimic or emulate the hardware architecture of an entire computer system. The operation of these components is emulated in the virtual machine that is being run on the host machine. An emulator program executing on the operating system software and hardware architecture of the host computer mimics the operation of the entire guest computer system.

The emulator program acts as the interchange between the hardware architecture of the host machine and the instructions transmitted by the software running within the emulated environment. This emulator program may be a host operating system (HOS), which is an operating system running directly on the physical computer hardware. Alternately, the emulated environment might also be a virtual machine monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). A host operating system and a VMM may run side-by-side on the same physical hardware.

One of the many advantages of a virtual machine (VM) over a physical machine is the ability to quickly and cheaply create multiple instances of the same virtual machine. If allowed by the virtual machine implementation, multiple virtual machines can exist simultaneously in a single host machine (host computer system) environment, and resources of the host machine can be divided among the various virtual machines. This flexible resource allocation becomes even more useful when combined with the ability to move, or "migrate," virtual machines from one host machine to another. Being able to migrate a virtual machine quickly and easily from one host machine to another is useful, for example, for "load balancing" systems, performing hardware or software upgrades, or handling disaster recovery.

In general, one primary purpose of any virtualization solution is to act as a referee between virtual machines and underlying hardware. Whereas virtual machines are always asking for access to hardware resources, the underlying hardware can only respond to a limited number of requests at a time. An overcommit of resources means that the sum total of all allocated guest resources exceeds the physical resources of a host machine.

Figure 1:
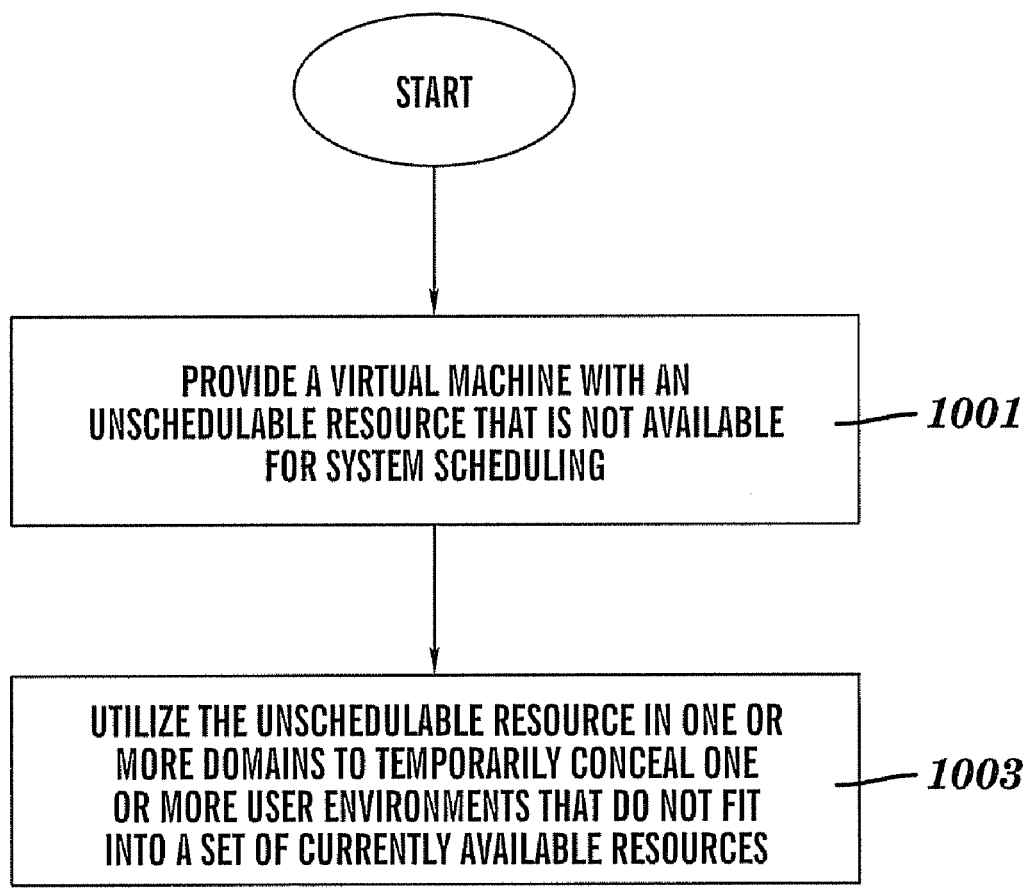
FIG. 1 is a flowchart setting forth a first illustrative operational sequence for supporting virtual machine guest migration overcommit.

FIG. 1 is a flowchart setting forth a first illustrative operational sequence for supporting virtual machine guest migration overcommit. The operational sequence of FIG. 1 commences at block 1001 where a virtual machine is provided with an unschedulable resource that is not generally available for system scheduling. The unschedulable resource may, but need not, be provided in the form of a memory buffer, or one or more network resources, or one or more resources that are accessible from a network. Next, at block 1003, the unschedulable resource is utilized in one or more domains to temporarily conceal one or more user environments that do not fit into a set of currently available resources, such that the one or more temporarily concealed user environments are not terminated or paged out.

Illustratively, block 1003 is implemented by utilizing techniques for at least one of storing data in networking equipment, storing data in a memory buffer, concealing data in network equipment, or sending data in networking equipment. The data to be stored, concealed, or sent is data for the one or more user environments that do not fit into the set of available resources. For example, a properly instrumented virtual machine may temporarily place a first virtual machine guest into the "ether" by using the unschedulable resource to temporarily store data for the first virtual machine guest. This step may be performed by allowing a network migration for the first guest to go directly into the ether, or by allowing a target hypervisor to eject one of its local virtual machines into the ether to make room for a second virtual machine guest. The decision as to how this step is performed, in terms of allowing a network migration versus allowing a hypervisor to eject, may be left to an overcommit policy manager.

Figure 2:
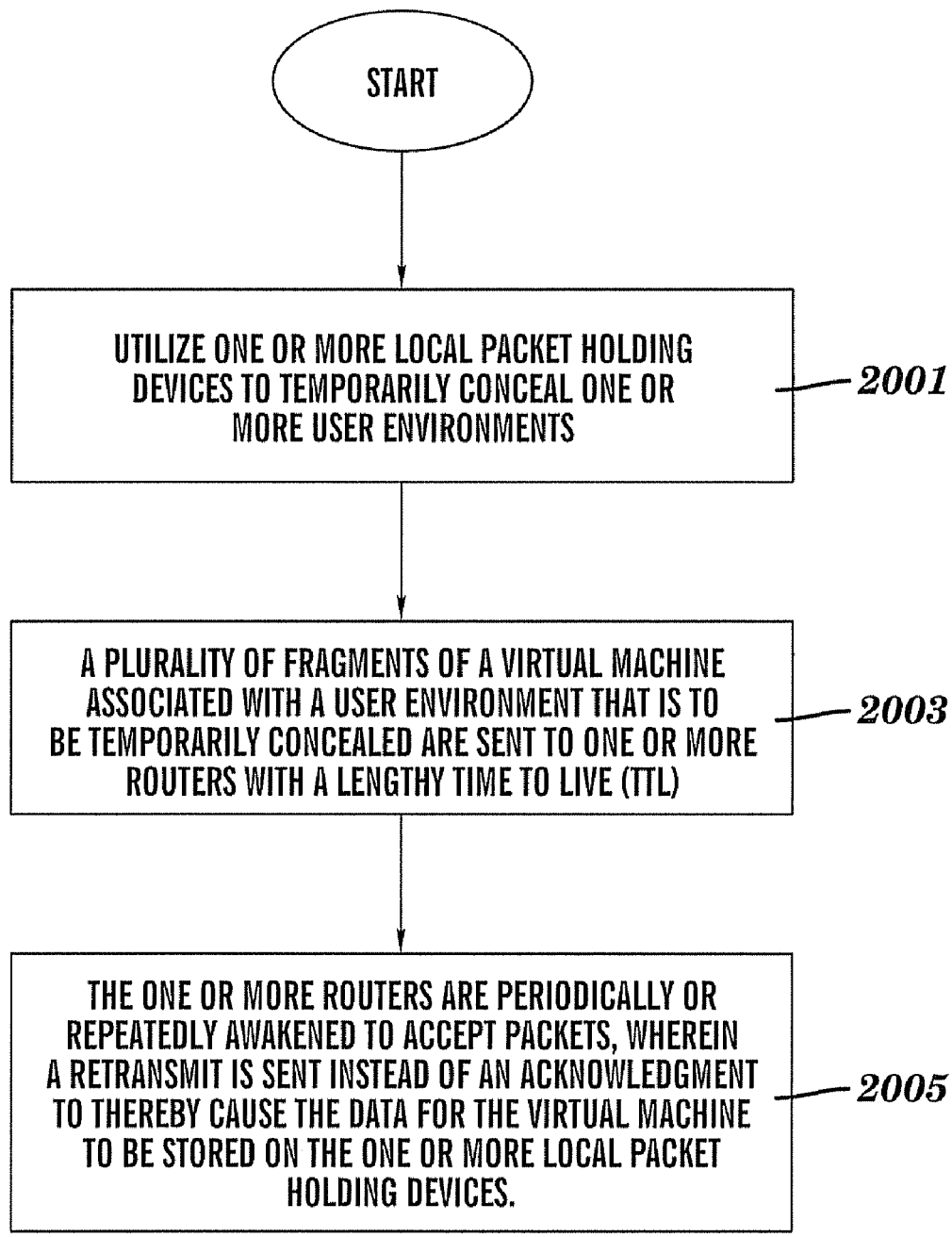
FIG. 2 is a flowchart setting forth a second illustrative operational sequence for supporting virtual machine guest migration overcommit.

FIG. 2 is a flowchart setting forth a second illustrative operational sequence for supporting virtual machine guest migration overcommit. More specifically, one illustrative approach for performing block 1003 (FIG. 1) involves utilizing one or more local packet holding devices (FIG. 2, block 2001) to temporarily conceal the one or more user environments described in conjunction with FIG. 1. The one or more local packet holding devices may include one or more network infrastructure devices on a local area network (LAN), one or more production servers, or various combinations of production servers and network infrastructure devices. A plurality of fragments of a virtual machine (VM) are sent to one or more routers with a lengthy time-to-live (TTL) (block 2003). The VM is associated with a user environment that is to be temporarily concealed. The one or more routers are periodically or repeatedly awakened to accept packets (block 2005), wherein a retransmit is sent instead of an acknowledgment (ack) to thereby cause the data for the virtual machine to be stored on the one or more local packet holding devices.

A variation of the approach presented in FIG. 2 involves a first remote site and a second remote site. A plurality of packets represent data for a user environment to be concealed. Simply ping pong the packets back and forth between the first remote site and the second remote site until the packets are needed by having each remote site receive and resend instantly. The packets will just loop back and forth between the first remote site and the second remote site. Moreover, one or more specially built routers could be constructed to automatically implement this ping pong approach.

TTL is a value in an Internet Protocol (IP) packet that tells a network router whether or not the packet has been in the network too long and should be discarded. For a number of reasons, packets may not get delivered to their destination in a reasonable length of time. For example, a combination of incorrect routing tables could cause a packet to loop endlessly. Normally, TTL is used to discard the packet after a certain time and send a message to the originator, who can decide whether to resend the packet. An initial TTL value is set, usually by a system default, in an 8-binary digit field of a packet header. The original idea of TTL was that it would specify a certain time span in seconds that, when exhausted, would cause the packet to be discarded. Since each router is required to subtract at least one count from the TTL field, the count is usually used to mean the number of router hops the packet is allowed before it must be discarded.

Each router that receives a packet subtracts one from the count in the TTL field. When the count reaches zero, the router detecting it discards the packet and sends an Internet Control Message Protocol (ICMP) message back to the originating host. Thus, this count should be set to a high value in order to implement the procedures described above with reference to FIG. 2. Using the multicast IP protocol, the TTL value indicates the scope or range in which a packet may be forwarded. By convention, a TTL value of 0 is restricted to the same host. A TTL value of 1 is restricted to the same subnet, 32 is restricted to the same site, 64 is restricted to the same region, 128 is restricted to the same continent, and 255 is unrestricted.

Figure 3:
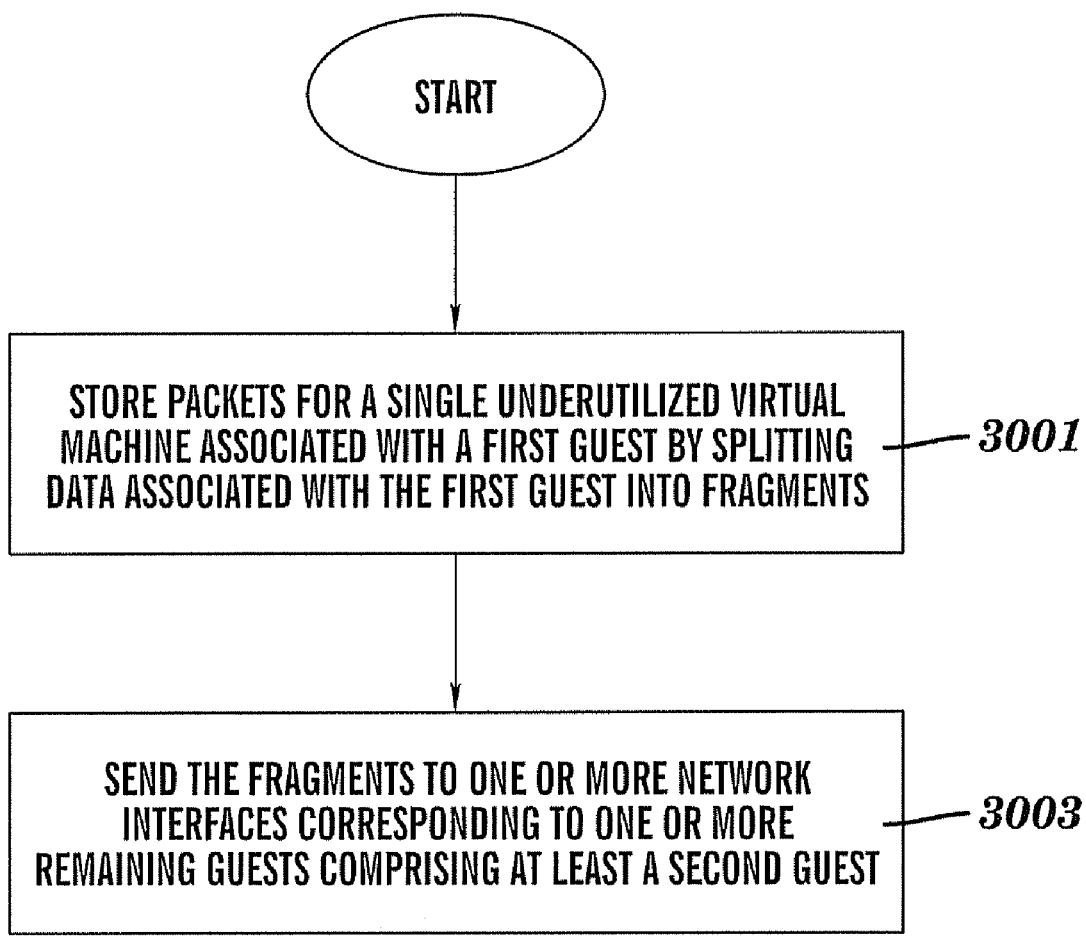
FIG. 3 is a flowchart setting forth a third illustrative operational sequence for supporting virtual machine guest migration overcommit.

FIG. 3 is a flowchart setting forth a third illustrative operational sequence for supporting virtual machine guest migration overcommit. More specifically, one illustrative approach for performing block 1003 (FIG. 1) involves storing packets for a single underutilized virtual machine associated with a first guest by splitting data associated with the first guest into fragments (block 3001). Next, the fragments are sent to one or more network interfaces corresponding to one or more remaining guests comprising at least a second guest (block 3003). Since the first guest and the remaining guests are all on the same hardware, one is actually overcommitting by using the already reserved local network memory buffers built into each virtual machine. Thus, in effect, one is using memory that already exists but which is intended for other purposes. Moreover, in paravirt or other hypervisor-aware situations, one or more network drivers can be specifically instrumented to implement the operational sequence of FIG. 3. Likewise, ICMP echoes to the local virtual machines, each with a component of the first guest that was split into fragments.

Figure 4:
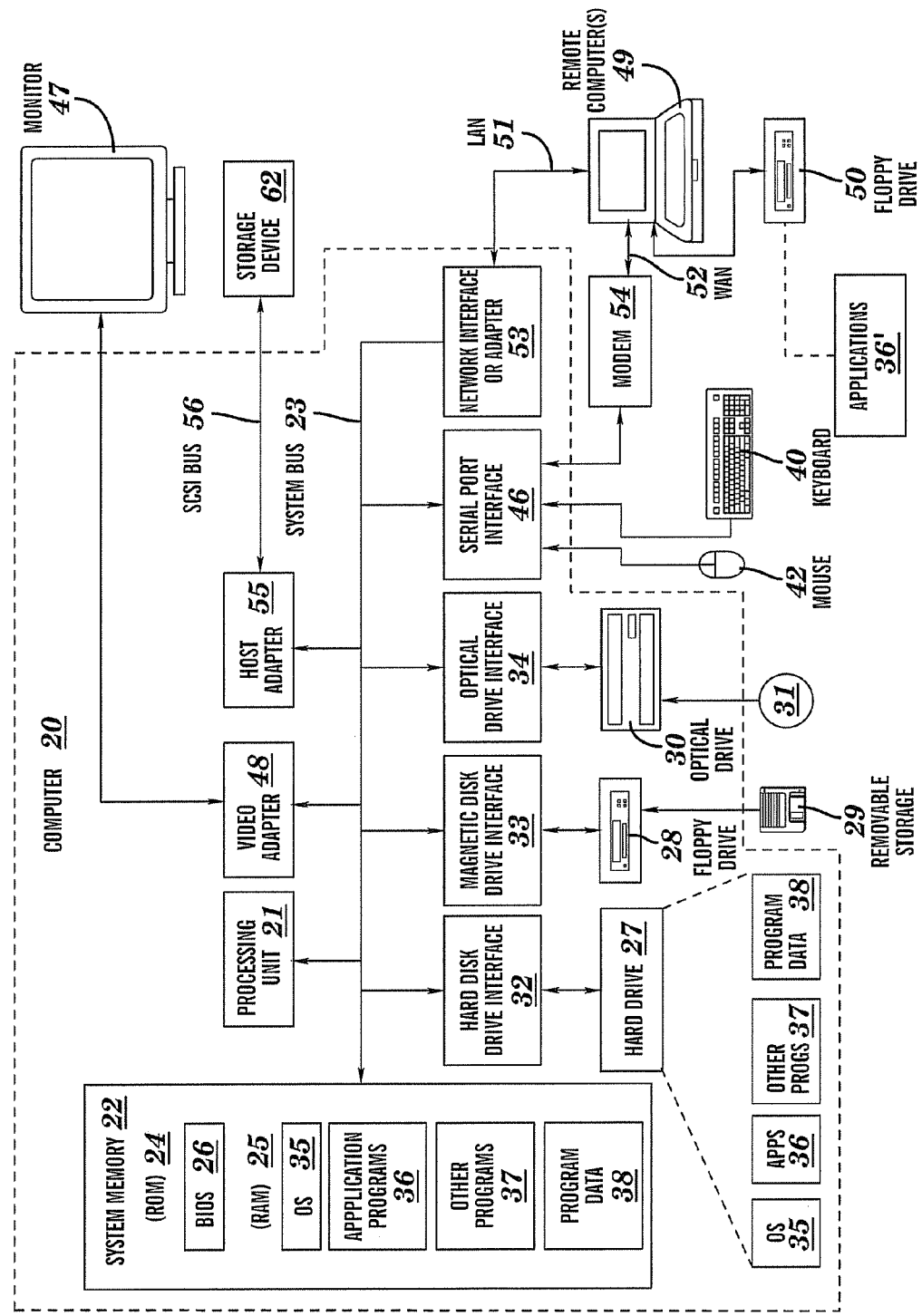
FIG. 4 is a hardware block diagram representing a first computer system for performing any of the procedures described in conjunction with FIGS. 1-3.

The operational sequences described in connection with any of FIGS. 1, 2, or 3 may execute on a computer. FIG. 4 provides a brief general description of an illustrative computing environment in which the methods disclosed herein may be implemented. Although not required, these operational sequences may be implemented in the form of computer executable instructions, such as program modules, being executed by a computer, such as a client workstation, a mainframe computer, or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 4, an exemplary general purpose computing system includes a computer 20 comprising a processing unit 21, a system memory 22, and a system bus 23 that couples various system components including the system memory to the processing unit 21. The system bus 23 may be implemented using any bus structure that provides a memory bus or memory controller, a peripheral bus, and a local bus having any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of programs or program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 4 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 4. The logical connections depicted in FIG. 4 include a local area network (LAN) 51 and a wide area network (WAN) 52. Such networking environments are commonplace in offices, enterprise wide computer networks, intranets and the Internet.

When used in a LAN networking environment, the computer 20 is connected to the LAN 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments disclosed herein are particularly well-suited for computerized systems, nothing in this document is intended to limit the invention to such embodiments.

From a conceptual perspective, computer systems generally comprise one or more layers of software running on a foundational layer of hardware. This layering may be performed for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 5:
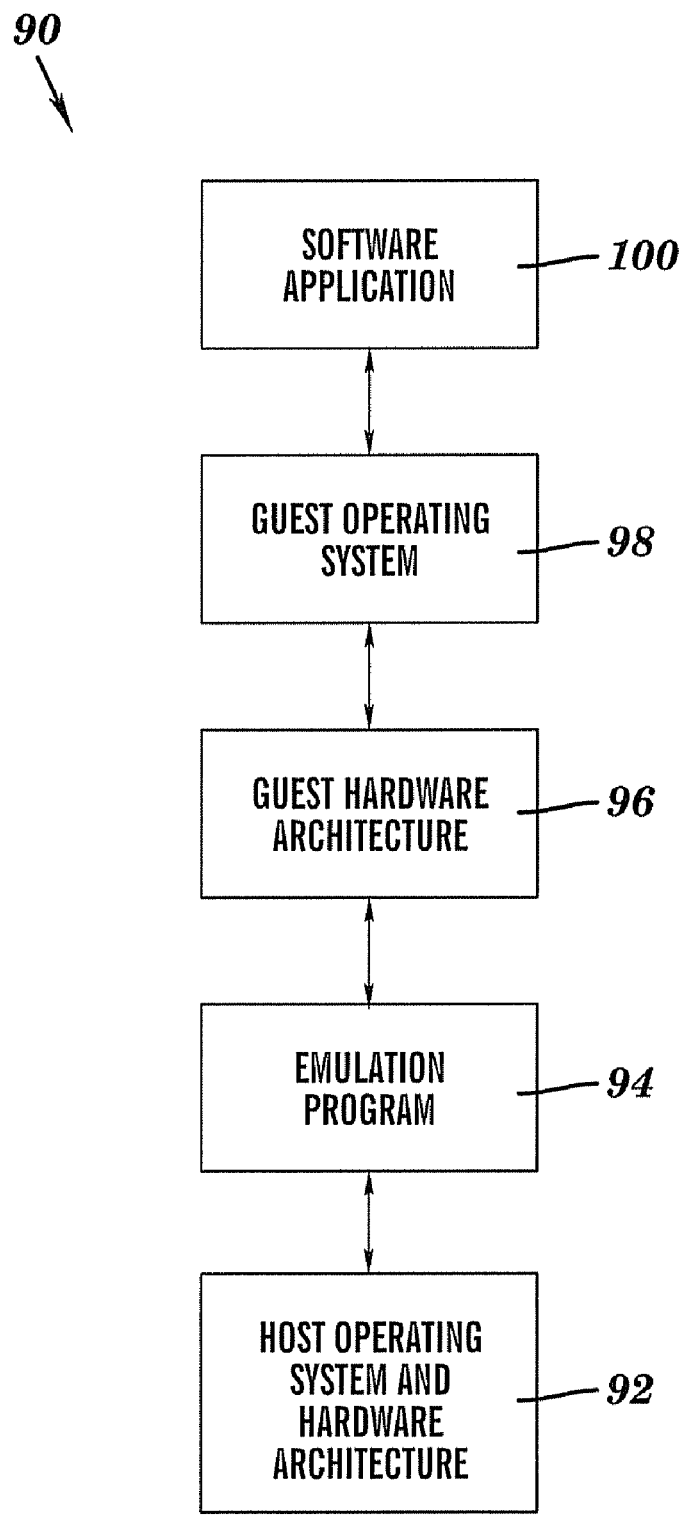
FIG. 5 is a logic diagram setting forth an illustrative layering of hardware and software architectures for an emulated operating environment in the context of the computer system of FIG. 4.

FIG. 5 is a diagram representing an illustrative logical layering of hardware and software architecture for an emulated operating environment in the computer system of FIG. 4. An emulation program 94 runs on a host operating system and/or hardware architecture 92. Emulation program 94 emulates a guest hardware architecture 96 and a guest operating system 98. Software application 100 in turn runs on guest operating system 98. In the emulated operating environment of FIG. 5, because of the operation of emulation program 94, software application 100 can run on the computer system 90 even though software application 100 is designed to run on an operating system that is generally incompatible with the host operating system and hardware architecture 92.

Figure 6:
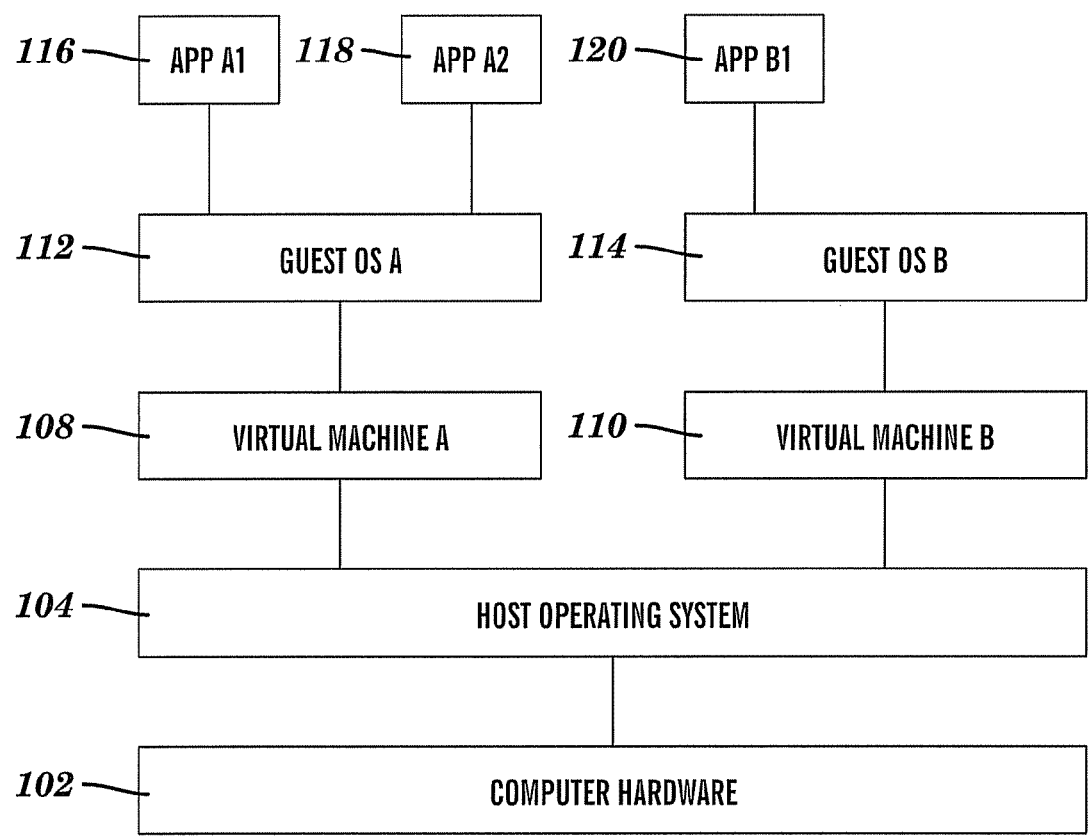
FIG. 6 is a hardware block diagram illustrating a second computer system for performing any of the procedures described in conjunction with FIGS. 1-3.

FIG. 6 illustrates a virtualized computing system on which any of the operational sequences described in connection with FIG. 1, 2, or 3 may be performed. The virtualized computing system of FIG. 6 comprises a host operating system software layer 104 running directly above physical computer hardware 102. The host operating system (host OS) 104 virtualizes all the resources of the machine by exposing interfaces that are the same as the hardware the host OS is virtualizing (which enables the host OS to go unnoticed by operating system layers running above it).

Above the host OS 104 are two virtual machine (VM) implementations, VM A 108, which may be, for example, a virtualized Intel 386 processor, and VM B 110, which may be, for example, a virtualized version of one of the Motorola 680X0 family of processors. Above each VM 108 and 110 are guest operating systems (guest OSs) A 112 and B 114 respectively. Above guest OS A 112 are running two applications, application A1 116 and application A2 118, and above guest OS B 114 is application B1 120. VM A 108 and VM B 110 are virtualized computer hardware representations that exist as software constructs and which are made possible due to the presence of specialized software code that not only presents VM A 108 and VM B 110 to Guest OS A 112 and Guest OS B 114 respectively, but which also performs all of the software steps necessary for Guest OS A 112 and Guest OS B 114 to indirectly interact with the real physical computer hardware 102. This complete functionality can be referred to as a virtual machine monitor (VMM) (not shown) where, for certain embodiments (such as the one illustrated in FIG. 6), the VMM comprises part of the host operating system 104.

In other embodiments, the VMM may be an application running above the host operating system 104 and interacting with the computer hardware only through said host operating system 104. In yet other embodiments, the VMM may comprise a partially independent software system that on some levels interacts indirectly with the computer hardware 102 via the host operating system 104 but on other levels the VMM interacts directly with the computer hardware 102 (similar to the way the host operating system interacts directly with the computer hardware). And in yet other embodiments, the VMM may comprise a fully independent software system that on all levels interacts directly with the computer hardware 102 (similar to the way the host operating system interacts directly with the computer hardware) without utilizing the host operating system 104 (although still interacting with said host operating system 104 insofar as coordinating use of said computer hardware 102 and avoiding conflicts and the like).

All of these variations for implementing the VMM are anticipated to form alternative embodiments for performing the methods described herein, and nothing herein should be interpreted as limiting these alternative embodiments to any particular VMM configuration. In addition, any reference to interaction between applications 116, 118, and 120 via VM A 108 and/or VM B 110 respectively (presumably in a hardware emulation scenario) should be interpreted to be in fact an interaction between the applications 116, 118, and 120 and a VMM. Likewise, any reference to interaction between applications VM A 108 and/or VM B 110 with the host operating system 104 and/or the computer hardware 102 (presumably to execute computer instructions directly or indirectly on the computer hardware 102) should be interpreted to be in fact an interaction between the VMM and the host operating system 104 or the computer hardware 102 as appropriate.

Figure 7:
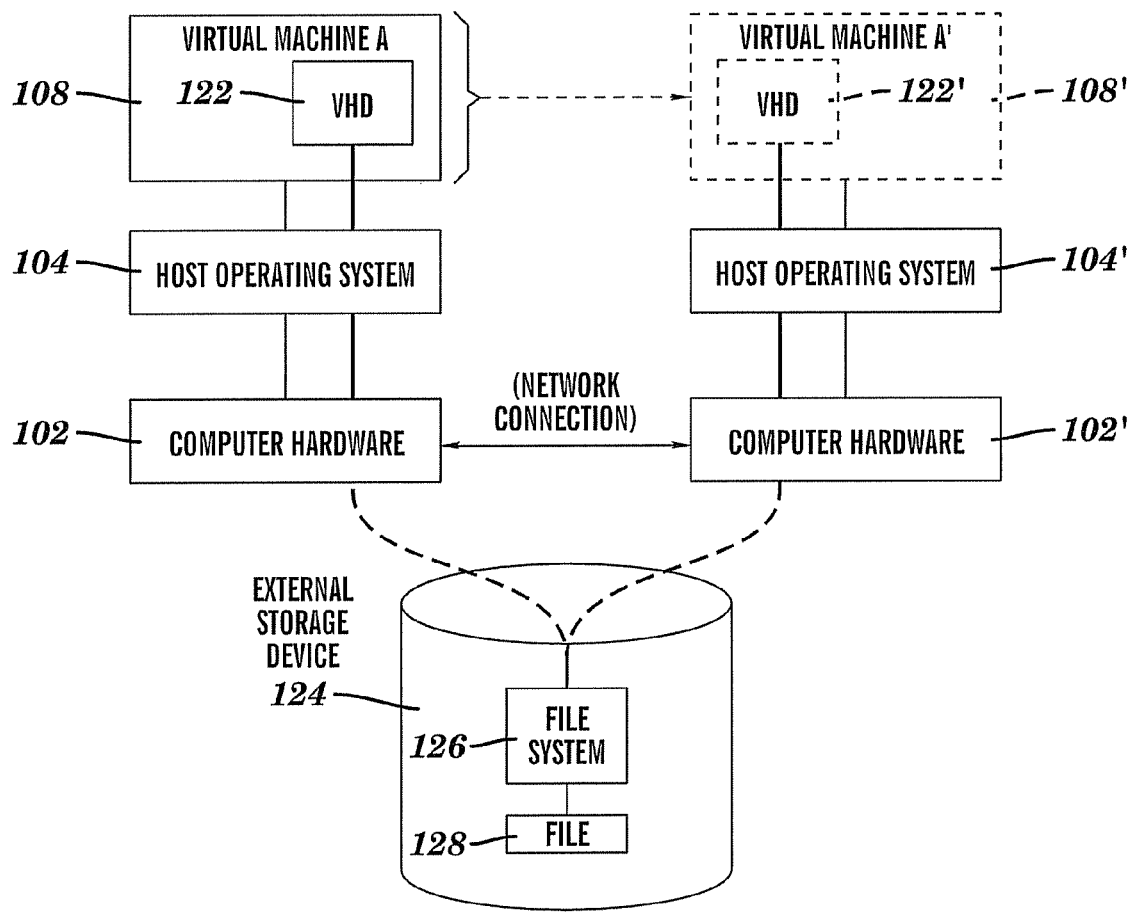
FIG. 7 is a logic diagram setting forth two illustrative instantiations of the computer system of FIG. 6 connected to a common external storage.

FIG. 7 is a block diagram that illustrates two instantiations of the system shown in FIG. 6, connected to common external storage in an illustrative embodiment for performing any of the procedures of FIGS. 1-3 in a virtual machine environment. More specifically, the networked system of FIG. 7 includes a first system comprising computer hardware 102, host OS 104, and VM A 108 that further includes a virtual hard drive (VHD) 122. Additionally, the networked system of FIG. 7 includes a second system comprising computer hardware 102', host OS 104', and VM A' 108' that further includes a VHD 122', wherein VM A' 108' and VHD 122' are representative of a replication of VM A 108 and VHD 122 that results from the voluntary and dynamic migration of VM A 108 from host OS 104 to host OS 104'. Computer hardware 102 of host OS 104 and computer hardware 102' host OS 104' are networked via, for example, an Ethernet connection to a common external storage device 124, such as a LAN or NAS server. The connection is via a standard communication mechanism, such as a fiber-based host bus adaptor or fiber channel adaptor, which provides a dedicated communication path between computer hardware 102 or computer hardware 102' and external storage device 124.

As known and understood by those skilled in the art, a VHD is a virtualized device, logically equivalent to a physical hard drive device, that a virtual machine emulates for a guest operating system. (As used herein, the terms "hard disk," "hard drive," and "hard disk drive" may be used interchangeably.) In FIG. 4, VM A 108 comprises VHD 122 which, for example, the virtual machine may emulate for guest OS A 112 as hard drive "C:" (not shown). VHD 122 is maintained by a file system 126 of external storage device 124. In this embodiment, VHD 122 is implemented as a single data file, file 128, on the physical hard disk of external storage device 124. Of course, as will be understood and readily appreciated by those skilled in the art, these VHD representations may be located in several files and across separate hard drives or separate computer systems, or they can be something other than a file (for example, a table in a database, a database, a block of active memory, etc.).

In the event that a need arises to migrate VM A from host OS 104 to host OS 104', such as for load balancing, software upgrades, hardware maintenance, or for reasons of disaster recovery, the device state and memory state of VM A are transferred to host OS 104', via a standard network connection between computer hardware 102 and computer hardware 102'. For example, when a virtual machine is migrated, the original virtual machine is permanently suspended, and a copy runs in a new location. One way to implement migration involves saving the device state and the entire memory state of the virtual machine to a file on disk, then copying the file to the new host and restoring the machine state.

Figure 8:
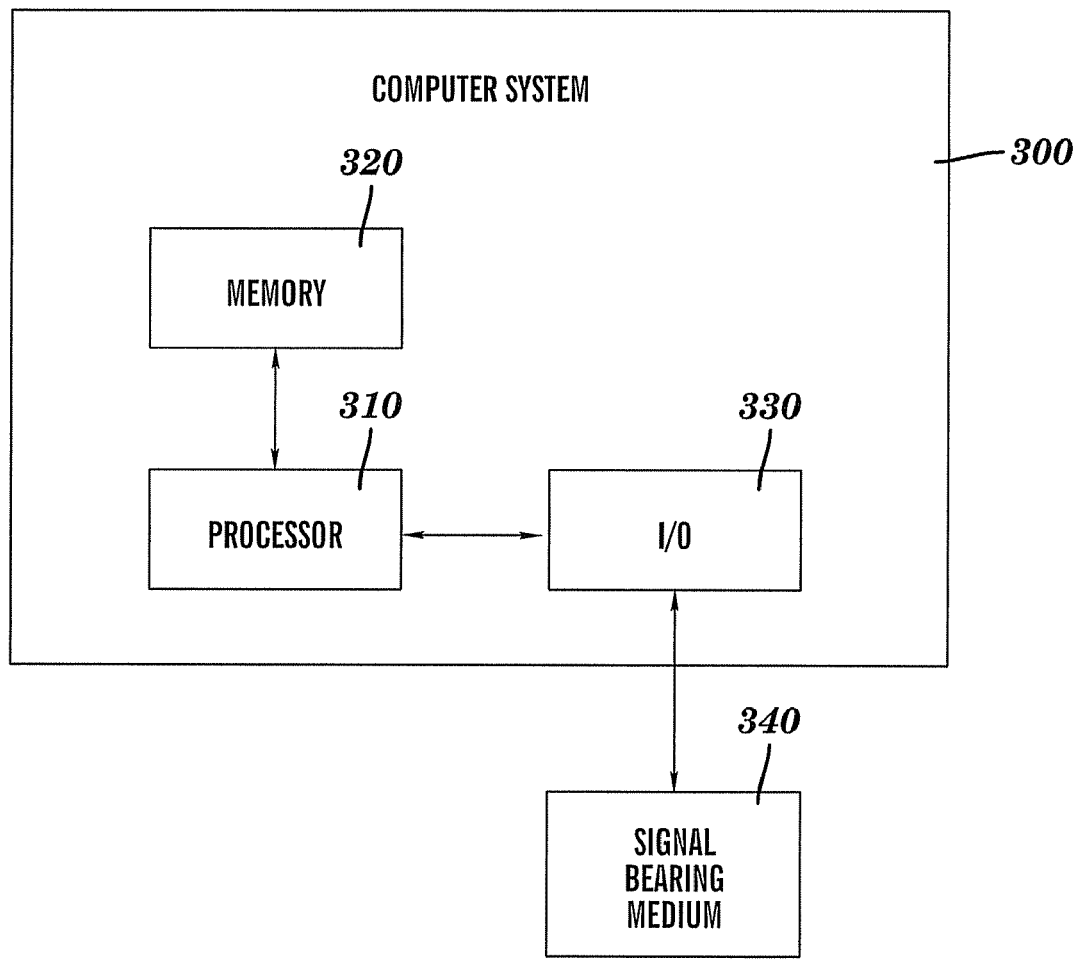
FIG. 8 is a block diagram setting forth an illustrative computer program product or hardware product for supporting virtual machine guest migration overcommit.

FIG. 8 is a block diagram setting forth an illustrative computer program product or hardware product for supporting virtual machine guest migration overcommit. The system includes a computer 300 operatively coupled to a signal bearing medium 340 via an input/output interface (I/O) 330. The signal bearing medium 340 may include a representation of instructions for supporting virtual machine guest migration overcommit, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes information for supporting virtual machine guest migration overcommit, wherein the information is represented, e.g., on the signal bearing medium 340 and communicated to the computer 300 via the I/O 330, wherein the processor 310 saves information as appropriate into a memory 320. This information may also be saved into the memory 320, e.g., via communication with the I/O 330 and the signal bearing medium 340.

The processor 310 executes a program comprising instructions for supporting virtual machine guest migration overcommit by providing a virtual machine with an unschedulable resource that is not available for system scheduling. The unschedulable resource may, but need not, be provided in the form of a memory buffer, or one or more network resources, or one or more resources that are accessible from a network. The unschedulable resource is utilized in one or more domains to temporarily conceal one or more user environments that do not fit into a set of currently available resources, such that the one or more temporarily concealed user environments are not terminated or paged out. The foregoing steps may be implemented as a program or sequence of instructions within the memory 320, or on a signal bearing medium, such as the medium 340, and executed by the processor 310.

The capabilities of the present invention can be implemented in software, firmware, hardware or some combination thereof As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention The foregoing exemplary embodiments may be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments execute specific microprocessor machine instructions. The computer program code could be implemented using electronic logic circuits or a microchip.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-executable method for supporting virtual machine guest migration overcommit, the method comprising:
   providing a virtual machine with an unschedulable resource that is not available for system scheduling;
   utilizing the unschedulable resource in one or more domains to temporarily conceal one or more user environments that do not fit into a set of currently available resources, such that the one or more temporarily concealed user environments are not terminated or paged out; and
   temporarily placing a first virtual machine guest into an "ether" by using the unschedulable resource to temporarily store data for the first virtual machine quest, wherein a network migration for the first virtual machine guest is allowed to go directly into the ether, or wherein a target hypervisor is allowed to eject one of its local virtual machines into the ether to make room for a second virtual machine guest.

2. The method of claim 1 further comprising providing the unschedulable resource in the form of a memory buffer, or one or more network resources, or one or more resources that are accessible from a network.

3. The method of claim 1 wherein utilizing the unschedulable resource in one or more domains is performed by at least one of: (a) storing data in networking equipment, (b) storing data in a memory buffer, (c) concealing data in network equipment, or (d) sending data in networking equipment; wherein the data to be stored, concealed, or sent is data for the one or more user environments that do not fit into the set of available resources.

4. The method of claim 1 further comprising using an overcommit policy manager to make a decision as to whether the network migration will be allowed as opposed to allowing the hypervisor to eject.

5. The method of claim 1 further comprising utilizing one or more local packet holding devices to temporarily conceal the one or more user environments, wherein the one or more local packet holding devices may include one or more network infrastructure devices on a local area network (LAN), one or more production servers, or various combinations of production servers and network infrastructure devices.

6. The method of claim 5 further comprising sending a plurality of fragments of a virtual machine (VM) to one or more routers with a lengthy time-to-live (TTL), wherein the VM is associated with a user environment that is to be temporarily concealed, and the one or more routers are periodically or repeatedly awakened to accept packets, wherein a retransmit is sent instead of an acknowledgment (ack) to thereby cause the data for the virtual machine to be stored on the one or more local packet holding devices.

7. A computer program product comprising a non-transitory storage medium readable by a processing circuit and storing instructions for execution by the processing circuit for facilitating a method for supporting virtual machine guest migration overcommit, the method comprising:
providing a virtual machine with an unschedulable resource that is not available for system scheduling;
utilizing the unschedulable resource in one or more domains to temporarily conceal one or more user environments that do not fit into a set of currently available resources, such that the one or more temporarily concealed user environments are not terminated or paged out; and
temporarily placing a first virtual machine guest into an "ether" by using the unschedulable resource to temporarily store data for the first virtual machine guest, wherein a network migration for the first virtual machine guest is allowed to go directly into the ether, or wherein a target hypervisor is allowed to eject one of its local virtual machines into the ether to make room for a second virtual machine guest.

8. The computer program product of claim 7 further comprising instructions for providing the unschedulable resource in the form of a memory buffer, or one or more network resources, or one or more resources that are accessible from a network.

9. The computer program product of claim 7 wherein utilizing the unschedulable resource in one or more domains is performed by at least one of: (a) storing data in networking equipment, (b) storing data in a memory buffer, (c) concealing data in network equipment, or (d) sending data in networking equipment; wherein the data to be stored, concealed, or sent is data for the one or more user environments that do not fit into the set of available resources.

10. The computer program product of claim 7 further comprising using an overcommit policy manager to make a decision as to whether the network migration will be allowed as opposed to allowing the hypervisor to eject.

11. The computer program product of claim 7 further comprising utilizing one or more local packet holding devices to temporarily conceal the one or more user environments, wherein the one or more local packet holding devices may include one or more network infrastructure devices on a local area network (LAN), one or more production servers, or various combinations of production servers and network infrastructure devices.

12. The computer program product of claim 11 further comprising sending a plurality of fragments of a virtual machine (VM) to one or more routers with a lengthy time-to-live (TTL), wherein the VM is associated with a user environment that is to be temporarily concealed, and the one or more routers are periodically or repeatedly awakened to accept packets, wherein a retransmit is sent instead of an acknowledgment (ack) to thereby cause the data for the virtual machine to be stored on the one or more local packet holding devices.

13. A hardware product comprising a non-transitory storage medium readable by a processing circuit and storing instructions for execution by the processing circuit for facilitating a method for supporting virtual machine guest migration overcommit, the method comprising:
providing a virtual machine with an unschedulable resource that is not available for system scheduling;
utilizing the unschedulable resource in one or more domains to temporarily conceal one or more user environments that do not fit into a set of currently available resources, such that the one or more temporarily concealed user environments are not terminated or paged out; and
temporarily placing a first virtual machine guest into an "ether" by using the unschedulable resource to temporarily store data for the first virtual machine guest, wherein a network migration for the first virtual machine guest is allowed to go directly into the ether, or wherein a target hypervisor is allowed to eject one of its local virtual machines into the ether to make room for a second virtual machine guest.

14. The hardware product of claim 13 further comprising instructions for providing the unschedulable resource in the form of a memory buffer, or one or more network resources, or one or more resources that are accessible from a network.

15. The hardware product of claim 13 wherein utilizing the unschedulable resource in one or more domains is performed by at least one of: (a) storing data in networking equipment, (b) storing data in a memory buffer, (c) concealing data in network equipment, or (d) sending data in networking equipment; wherein the data to be stored, concealed, or sent is data for the one or more user environments that do not fit into the set of available resources.

16. The computer program product of claim 13 further comprising using an overcommit policy manager to make a decision as to whether the network migration will be allowed as opposed to allowing the hypervisor to eject.

17. The computer program product of claim 13 further comprising:
utilizing one or more local packet holding devices to temporarily conceal the one or more user environments, wherein the one or more local packet holding devices may include one or more network infrastructure devices on a local area network (LAN), one or more production servers, or various combinations of production servers and network infrastructure devices; and sending a plurality of fragments of a virtual machine (VM) to one or more routers with a lengthy time-to-live (TTL), wherein the VM is associated with a user environment that is to be temporarily concealed, and the one or more routers are periodically or repeatedly awakened to accept packets, wherein a retransmit is sent instead of an acknowledgment (ack) to thereby cause the data for the virtual machine to be stored on the one or more local packet holding devices.

* * * * *